United States Patent [19]
Spils

[11] Patent Number: 4,503,884
[45] Date of Patent: Mar. 12, 1985

[54] ANGLE GLOBE VALVE

[76] Inventor: Richard W. Spils, 1900 Wildwood La., Anchorage, Ak. 99503

[21] Appl. No.: 602,093

[22] Filed: Apr. 20, 1984

Related U.S. Application Data

[63] Continuation of Ser. No. 390,982, Jun. 22, 1982, abandoned.

[51] Int. Cl.³ ............... F16K 31/50; F16K 37/00
[52] U.S. Cl. ............... 137/553; 137/454.6; 251/122; 251/282
[58] Field of Search ............... 251/121, 122, 282; 137/454.5, 454.6, 553

[56] References Cited

U.S. PATENT DOCUMENTS

| | | | |
|---|---|---|---|
| 1,583,800 | 5/1926 | Schaub et al. | 251/121 |
| 1,754,138 | 4/1930 | Agee | 251/121 |
| 1,919,232 | 7/1933 | Lee | 251/122 |
| 1,919,233 | 7/1933 | Lee | 251/122 |
| 2,630,292 | 3/1953 | Skweir | 251/282 |
| 2,717,003 | 9/1955 | Jay et al. | 251/282 |
| 3,260,501 | 7/1966 | Raymond | 251/282 |
| 3,272,219 | 9/1966 | Franz | 137/454.5 |
| 3,730,479 | 5/1973 | Baumann | 251/121 |
| 4,044,991 | 8/1977 | Waller | 251/121 |

Primary Examiner—Alan Cohan
Assistant Examiner—John A. Rivell
Attorney, Agent, or Firm—Klarquist, Sparkman, Campbell, Leigh & Whinston

[57] ABSTRACT

A multi stage valve
(1) having a valve member actuating mechanism located on the wide side of the valve member;
(2) having a valve member and seat equipped with plural steps of increasing diameter in an upstream direction;
(3) wherein the steps are configured so that a straight line can extend between opposed steps in all open positions of the valve;
(4) wherein the steps are configured so that the flow passage varies in width, being narrowest at the zones of opposed steps;
(5) wherein the movement of the valve member is of a magnitude equal to the width of plural steps;
(6) having a movable assembly which includes the valve member and its actuating mechanism adapted for ready reception by valve bodies of various configurations;
(7) having an arrangement for balancing the pressure across the valve member when it is closed;
(8) having an arrangement for exteriorly showing the exact position of the valve member at all times;
(9) having other features as recited herein.

11 Claims, 4 Drawing Figures

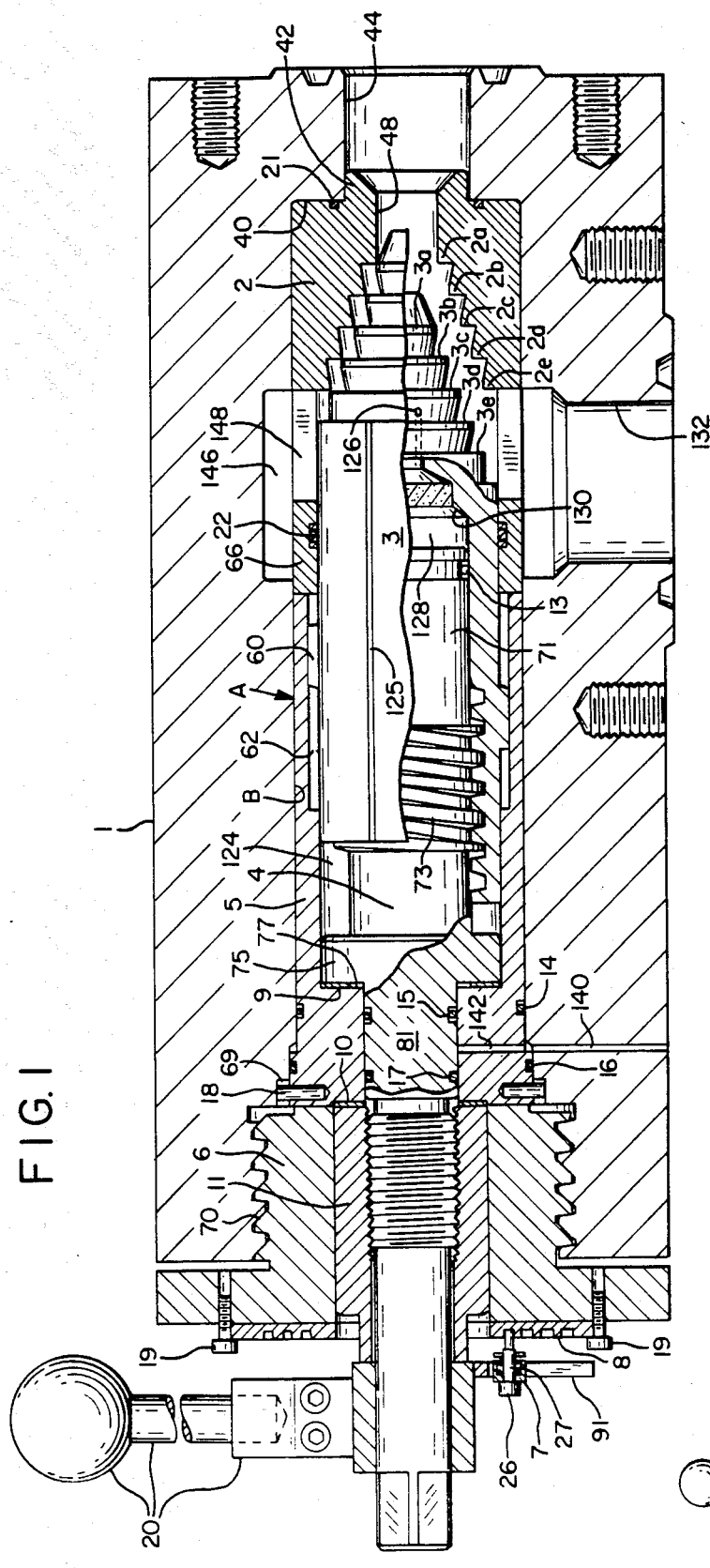
FIG.1
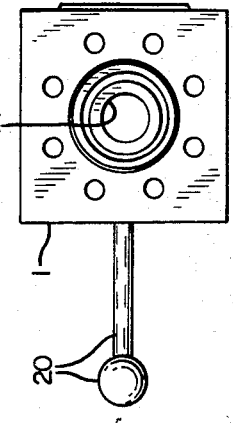
FIG.4
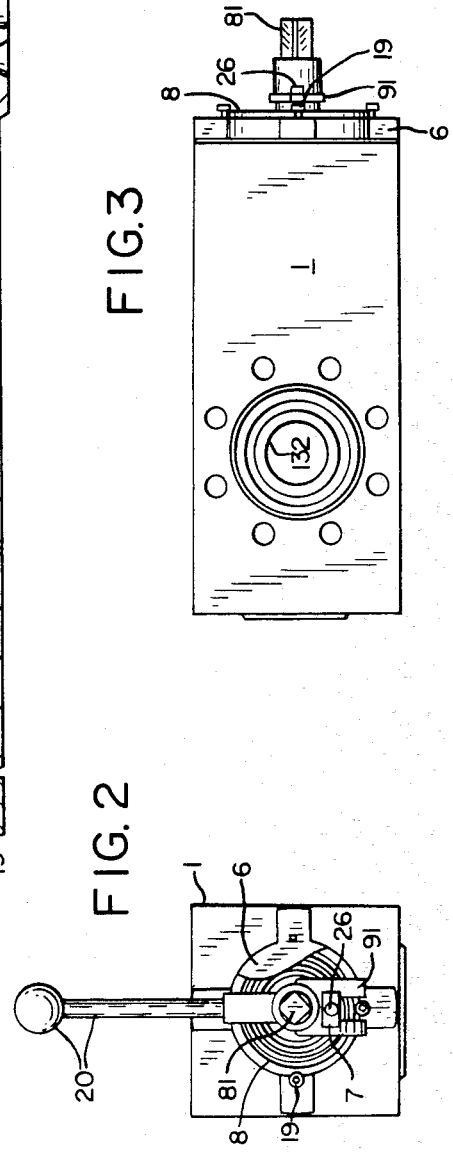
FIG.3
FIG.2

ANGLE GLOBE VALVE

This application is a continuation of application Ser. No. 390,982, filed June 22, 1982, now abandoned.

The present invention relates to a multiple stage high pressure valve for handling fluids, particularly gases, but also liquids. To meet increasingly sophisticated problems, industry has insisted on higher and higher pressures. This has been accompanied by a greater range of problems in handling higher pressure drops and fluid velocities. My copending application entitled ANGLE GLOBE VALVE, Ser. No. 165,696, filed July 3, 1980, is concerned with such problems. In my prior valve, the steps are of basically the same diameters. The present valve is directed toward a multiple stage valve in which the steps are of varying diameters to attain approximately equal pressure reduction at each stage, when handling gases.

A valve having varying diameter steps is not, per se, new. For instance, the U.S. patent to Baumann No. 3,485,474, issued Dec. 23, 1969, relates to an adjustable fluid restrictor having progressively increasing size stages. Valves of this type have a number of drawbacks. Among these are the following: actuation is from the small end of the steps series; there is no balancing of pressures acting against the stepped valve member at closed position; the valves are not readily disassembled, particularly in the field; each step typically cooperates with only a single other step and often it is difficult to tell from the exterior of the valve the position of the stepped valve member.

SUMMARY OF THE INVENTION

The present invention overcomes the above and other problems by providing a valve which is actuated from the wide side of the steps, making a number of advantages possible including a pressure force balance. The improved valve also includes a pod concept in which a seat member and an actuating assembly fit within a bore of uniform diameter adapting the operative parts of the valve to installation in a number of body configurations. The valve is further arranged so that each step on the valve member can cooperate with plural steps of the seat member. The invention contemplates a valve member in which the stepped portion is detachably connected to an actuating portion for ready replacement of the stepped portion when significant wear occurs. The valve also has an indicator for indicating the position of the valve member.

An object of the invention is to provide an improved multiple stage angular globe valve, and particularly one having varying diameter steps.

Various other objects of the invention will be apparent from the following description taken in connection with the accompanying drawings, wherein:

FIG. 1 is a vertical midsectional view through an angle globe valve embodying the concepts of my invention, showing the valve member plug in split view, with the upper portion closed, while the lower portion is partially open;

FIG. 2 is a top view of the actuating end;

FIG. 3 is a side elevational view of the outlet side of the valve; and

FIG. 4 is a bottom view of the inlet end of the valve.

Referring to FIG. 1, my multistage angle valve 1 has a tubular valve body 1, formed with a main bore B of circular cross section, in which a valve pod fits. The pod includes a seat member 2 and an operative assembly A, which cooperates with the seat member in controlling the flow of fluid through the valve. The seat member fits against a shoulder 40 on the body and has a boss 42 projecting into an inlet opening 44 formed in the body 1. An O-ring 21 forms a seal between the seat member and the body at the shoulder.

The seat member is interiorly formed with a series of indented female steps labeled 2a, 2b, 2c, 2d and 2e. The latter merges with an inlet bore 48 communicating with inlet opening 44. The steps are of progressively increasing diameter proceeding from right to left as the parts are shown in FIG. 1.

The operative assembly A comprises a number of parts, a primary one of which is a cylindrical valve member in the form of plug 3 terminating in a frustoconical head portion defined by a series of indented male steps labeled 3a, 3b, 3c, 3d and 3e. These cooperate with female steps 2a-2e in a manner to be presently explained.

The portion of the plug to the left of the steps 3a-3e is hollow and slidably fits within a closure sleeve 5, and has keys 60 fitting within keyways 62 formed on the interior of the closure sleeve to permit longitudinal but prohibit turning movement of the plug relative to the sleeve. The closure sleeve abuts against a tubular portion 66 of the seat member 2. Plural Teflon O-rings 22 are provided on the interior of portion 66 and provide cushioning guides for the tubular portion of the plug.

At assembly, the closure sleeve 5 is slidably fitted into the main bore B of the body until the right hand end of the closure sleeve abuts against the seat member 2. The closure sleeve is so oriented that a pair of dowel pins 18 on the sleeve fit within recesses 69 on the body, to prevent turning movement of the closure sleeve relative to the body. The sleeve is retained in place by a bonnet 6 which has a buttress threaded fit at 70 with the body.

The pod further includes a power screw in the form of a screw stem 4 whose right hand portion 71 defines a piston slidably received within the tubular portion of the plug 3. One or more seals 13 are provided on the piston to effect sealing contact between the piston and the tubular portion of the plug. The stem has acme threads 73 that engage complementary threads on the interior of the tubular portion of the plug, so that rotary movement of the stem is translated into longitudinal movement of the plug.

A collar or flange 75 is formed on the stem and has a thrust relationship with a shoulder 77 on the closure sleeve 5 via a thrust washer 9. The stem has a shaft portion 81 rotatably extending through a bore in the left hand end of the closure sleeve 5 in sealing relationship thereto by means of seals 15 and 17. A nut 11 threads on the shaft portion 81 and bears against a thrust washer 10 interposed between the nut and the left hand end of the closure sleeve. The contact pressure between the thrust washers 9 and 10 and the parts with which they are associated, is determined by the tightness with which the nut 11 is threaded on the stem 4. The adjusted position of the nut is maintained by the collar portion of a handle 20, which is detachably secured (such as by clamping) onto the shaft portion 81. The handle facilitates turning movement of the stem, but may be removed, and power actuation of the stem achieved in any desired fashion by a connection to the shaft portion.

The parts are designed so that the plug is moved from its closed position to its fully opened position by three turns of the handle 20. A spiral groove on an indicator plate 8 radially shifts an indicator slide 26 along an arm 91 on the handle 20. The indicator plate is adjustably secured to the bonnet 6 by screws 19 which, when loosened, enable circumferential adjustment of the indicator plate at assembly time, so that there is correspondence between the spiral groove of the indicator plate and the position of the plug 3 relative to the seat member 2. A spring biasing arrangement at 7 urges a pin-like shank portion 27 of the slide indicator into the groove of the indicator plate 8.

The relationship of the parts is such that one turn of the handle 20 will move the plug 3 an axial or longitudinal distance equal to the width of one step. In the particular embodiment of the valve shown, the distance the plug moves from its fully opened position to its fully closed position is equal to the width of three steps. FIG. 1 shows a plug in split view with the upper half being in its closed position, but the lower half being in its two-thirds open position. The position of the slide indicator 26 has been chosen to correspond to the closed position of the plug, so that the slide indicator is in its inward-most position as the parts are shown in FIG. 1.

When a differential pressure exists across the valve member or plug 3, such as when it is closed, I provide for a pressure force-balance across the plug by conducting fluid from the outlet side of the plug to a chamber 124 provided between the collar 75 and the left hand end face of the tubular portion of the plug 31. The chamber communicates with the outlet 132, when the valve is closed, by means of a groove 125 formed in the exterior of the plug 3.

Also, I provide an axial bore 126 extending from step 3c to a chamber 128 provided between the piston portion 71 of the valve stem and a blind interior end face 130 of the tubular portion of the plug 3. Thus, while the pressure in the inlet 44 may be quite high, relative to whatever pressure exists in an outlet 132, the thrust of this pressure to the left against the plug 3 is balanced and offset by the sum of the forces created by the pressure in 124 acting against the left hand end face of the tubular portion of the plug 3 and the pressure in chamber 128 acting against the blind interior end face 130 of the plug.

There is a primary sealing means at 14, between the exterior of the closure sleeve 5 and the bore B in the body. There is a back up seal 16 provided between the closure sleeve and the interior of the valve body. Between seals 14 and 16, I provide a bleed port 140. Should the seal 14 commence to fail, fluid will leak past the seal and exit through the bleed port and alert the operator of the imminence of failure of the seal.

The base of the closure sleeve is formed with an extension bleed passage 142, aligned with passage 140. Should primary seal 15 commence to fail, seal 17 serves as a back up. Fluid leaking past seal 15 will travel through ports 142 and 140 and exit to alert the operator of a seal problem.

The valve outlet 132 has its axis angularly related to the axis of inlet 44, and leads into an annular chamber 146 formed around the interior of the valve body. Plural slots 148 are formed in the tubular portion of seat member 2, to provide for communication between the inlet and outlet, when the plug is open to any extent. The slots 148 are distributed circumferentially around the tubular portion of the plug 3, to achieve 360 degrees of inlet-outlet communication, when the plug is unseated.

I prefer to provide a sintered metal micro-pore filter across the chamber 128 to keep solids from access to the remainder of the interior of the tubular portion of the plug 3.

In operation, when the plug is in its closed position, step 3d, which has a beveled corner, engages solidly against the edge of step 2d, while the unbeveled stops 31a–31c are in close proximity to the corresponding seat steps 11a–11c. In practice, the diameters of seat steps 11a–11c are made slightly less than the interior diameters of the corresponding seat steps, to assure that the sealing contact occurs at the fourth step, step 2d in the particular embodiment of the invention disclosed.

Plug step 3e also has a bevel on its corner, and the step is of slightly larger diameter than the interior diameter of step 2e, but the axial spacing is such that it is slightly spaced from the corner of step 2e when plug step 3d is in sealing engagement with the corner of seat step 2d. However, as the wear occurs between the steps 3d and 2d, plug step 3e eventually will make contact with seat step 2e to continue effective closure action of the plug 3, despite significant wear having occurred.

Note that each of the steps on the plug 3 cooperates with plural steps on the seat member 2, not merely a single step. For example, plug step 3a, in the closed position of the valve cooperates with seat step 2a and continues to do so as the valve is cracked. Then, as it passes seat step 2b, it creates a restriction, and later does the same with seat step 2c and finally comes to a rest position opposite step 2d.

Further note that with the construction of the steps as shown, while there are successive zones of restriction (as the valve opens and closes) these are aligned conically with one another. However, the reverse tapering of both interior and exterior steps creates a deflected and, therefore, tortuous path flow pattern through the valve.

The present valve is ideal for handling gases because as the gas pressure decreases the gas volume increases. With the expanding step design, equal approximate pressure reduction at each stage is achieved. The present valve may provide an ideal let down for high pressure water (such as required for water injection). In this case, since the water does not expand with reduced pressure, each successive stage, having greater flow space, will take less pressure loss. It would appear that maximum capacity will be reached, with the seat configuration shown, at one and one-half turns. This is not true when gases are handled.

What is claimed is:
1. In a multiple stage valve,
a valve body,
a valve member and a seat,
said valve member having plural steps matched by steps on said seat, to provide plural sets of steps, wherein each set comprises a step on the valve member and a corresponding step on the seat,
said valve member being movable from an open to a closed position,
said steps being configured and disposed such that in any open position of said valve member, a straight line can extend between said steps in spaced relation thereto,
said steps being of increasing diameter in one direction,
certain sets only of said steps being configured for seating engagement,
one of said certain sets comprising an intermediate set of said plural sets of steps, certain of the other of said sets being configured so that they cannot engage one another but can only assume closely disposed positions.

2. A multiple stage valve as recited in claim 1 in which said steps are of increasing diameter in downstream direction.

3. A multiple stage valve as recited in claim 1, in which said steps are of indented serrate form.

4. A multiple stage valve as recited in claim 3, in which means mount said valve member for moving a distance such that each of its steps moves past plural seat steps, said indented serrated form comprising intersecting planar wall portions.

5. A multiple stage valve as recited in claim 4 in which there are actuating means for said valve member disposed nearer to the larger steps than to the smaller steps, certain of said planar wall portions being disposed in planes perpendicular to the axis of said valve member.

6. In a multiple stage valve,
a valve body having an inlet and an outlet,
a valve member and a seat,
said valve member having plural steps matched by steps on said seat,
said valve member being movable from an open to a closed position,
said valve member comprising a tubular member having closed seating end and an open opposite end,
a power screw turnably mounted on and extending to said body and having a piston portion sealingly fitting within said tubular member and together with the latter defining a chamber,
said power screw having a second portion operatively threadingly interfitting with said tubular member,
said power screw having a shoulder portion beyond said tubular member which together with the latter define an annular chamber,
and means providing a pressure balance across said valve member in its closed position,
said means comprising a passageway within the seating end of said tubular member communicating with said first named chamber for placing said chamber in communication with the inlet,
said tubular portion having a passageway for placing said second chamber in communication with the outlet.

7. In a multiple stage valve,
a valve body,
a pod slidably insertable into said valve body,
a seat member in said valve body,
said pod including an operative assembly including a valve member of tubular form having a closed end portion providing a plug disposed in cooperative relationship to said seat member,
a closure sleeve slidably received by said bore and having a keyed relationship with said plug,
means for preventing turning movement of said closure sleeve relative to said body,
an operating stem projecting into said body and into a tubular portion of said valve member and having a threaded connection with said tubular portion to cause axial movement of said plug upon rotation of said stem,
said closure sleeve having an internal shoulder portion,
said stem having a flange in thrust transmitting relationship to said shoulder to transmit to said shoulder thrust forces imposed upon said stem in the direction of said shoulder,
said shoulder being provided by a restricted portion of said closure sleeve,
said stem having a flange disposed on the seat side of said restricted portion,
a nut on the opposite side of said restricted portion threadedly engaging said stem and disposed in thrust transmitting relationship to said closure sleeve for establishing a thrust relationship between said stem and said restricted portion.

8. A valve as recited in claim 7 in which there is a bonnet threadedly received by said body and retaining said assembly within said valve body,
said bonnet having a turnable relationship with respect to said nut.

9. A valve as recited in claims, 7 or 8 in which said valve stem has a handle facilitating its rotation,
means for visually exteriorly indicating the position of said plug relative to said seat,
and means whereby said handle limits unthreading movement of said nut.

10. A valve as recited in claim 10, wherein there are sealing means disposed between said stem and said restricted portion of said sleeve at a place remote from said plug.

11. In a multiple stage valve as recited in claim 7 in which said pod includes said seat member.

* * * * *